US012497293B2

(12) United States Patent
Yu et al.

(10) Patent No.: US 12,497,293 B2
(45) Date of Patent: Dec. 16, 2025

(54) METHOD AND SYSTEM FOR PREPARING HYDROGEN CHLORIDE AND AMMONIA GAS BY USING AMMONIUM CHLORIDE

(71) Applicant: YUANCHU TECHNOLOGY (BEIJING) CO., LTD., Beijing (CN)

(72) Inventors: Changjun Yu, Beijing (CN); Qi Wang, Beijing (CN)

(73) Assignee: YUANCHU TECHNOLOGY (BEIJING) CO., LTD., Beijing (CN)

( * ) Notice: Subject to any disclaimer, the term of this patent is extended or adjusted under 35 U.S.C. 154(b) by 848 days.

(21) Appl. No.: 17/297,081

(22) PCT Filed: Aug. 12, 2019

(86) PCT No.: PCT/CN2019/100144
§ 371 (c)(1),
(2) Date: May 26, 2021

(87) PCT Pub. No.: WO2020/107942
PCT Pub. Date: Jun. 4, 2020

(65) Prior Publication Data
US 2022/0024762 A1      Jan. 27, 2022

(30) Foreign Application Priority Data

Nov. 27, 2018   (CN) .......................... 201811423327.4

(51) Int. Cl.
*C01B 7/05*       (2006.01)
*C01C 1/02*       (2006.01)
(52) U.S. Cl.
CPC .............. *C01B 7/055* (2013.01); *C01C 1/026* (2013.01); *B01J 2219/0004* (2013.01)
(58) Field of Classification Search
CPC .......... C01B 7/055; C01C 1/026; C01C 1/028
See application file for complete search history.

(56) References Cited

U.S. PATENT DOCUMENTS 1,718,420 A      6/1929   Kessler
2,735,749 A  *   2/1956   Prutton .................. C01B 7/055
                                                            423/481
(Continued)

FOREIGN PATENT DOCUMENTS

CA           543342 A         7/1957
CN         2766946 Y   *     3/2006
(Continued)

OTHER PUBLICATIONS

English translation of CN 101117212 A Description (Year: 2008).*
(Continued)

*Primary Examiner* — Jennifer A Leung
(74) *Attorney, Agent, or Firm* — Westman, Champlin & Kochler, P.A.

(57) ABSTRACT

Disclosed is a system and method for preparing hydrogen chloride and ammonia gas by using ammonium chloride. The system includes a decomposition reactor and at least one regeneration reactor, or includes a reactor that may serve as the decomposition reactor and the regeneration reactor; ammonium chloride in particle form is continuously added to the decomposition reactor via a solid particle feed apparatus, and reacts with molten-state ammonium hydrogen sulfate to generate hydrogen chloride gas and an intermediate material; the intermediate material is discharged to the regeneration reactor, and heated therein to decompose into ammonium hydrogen sulfate and ammonia gas; and the ammonium hydrogen sulfate is returned to the decomposition reactor for recycling. The present disclosure provides an industrial feasible implementation solution for continuous decomposition of ammonium chloride, lowers volatilization of ammonium chloride by continuously and slowly adding ammonium chloride in particle form, and improves utilization rate of the ammonium chloride.

20 Claims, 6 Drawing Sheets

(56) References Cited

U.S. PATENT DOCUMENTS 2,787,524 A 4/1957 Claflin, Jr.
4,293,532 A 10/1981 Sasaki et al.

FOREIGN PATENT DOCUMENTS

| CN | 101100287 A | | 1/2008 |
|---|---|---|---|
| CN | 101117212 A | * | 2/2008 |
| CN | 102009954 A | | 4/2011 |
| CN | 102285641 A | | 12/2011 |
| CN | 102642812 A | | 8/2012 |
| CN | 103145100 A | | 6/2013 |
| CN | 105753016 A | | 7/2016 |
| CN | 108014731 A | * | 5/2018 |
| CN | 109354039 A | | 2/2019 |
| FR | 1066255 A | | 6/1954 |
| GB | 765 357 A | | 1/1957 |
| JP | S58-161902 A | | 9/1983 |
| RU | 2640552 C2 | * | 1/2018 |

OTHER PUBLICATIONS

International Search Report (including English translation) and Written Opinion for International Application No. PCT/CN2019/100144, dated Nov. 20, 2019, 10 pages.

First Office Action, including Search Report, for Chinese Patent Application No. 201811423327.4, dated Jun. 9, 2023, 23 pages.

Extended European Search Report for European Patent Application No. 19888341.5, dated Jul. 1, 2022, 8 pages.

* cited by examiner

METHOD AND SYSTEM FOR PREPARING HYDROGEN CHLORIDE AND AMMONIA GAS BY USING AMMONIUM CHLORIDE

CROSS-REFERENCE TO RELATED APPLICATIONS

This application is a Section 371 National Stage application of International Application No. PCT/CN2019/100144, filed on Aug. 12, 2019, which published as WO 2020/107942 A1, on Jun. 4, 2020, and claims priority to Chinese Patent Application No. 201811423327.4, filed on Nov. 27, 2018, entitled "METHOD AND SYSTEM FOR PREPARING HYDROGEN CHLORIDE AND AMMONIA GAS BY USING AMMONIUM CHLORIDE", the contents of which are incorporated herein by reference in their entireties.

FIELD OF TECHNOLOGY

The present invention relates to a chemical field of inorganic salt and Sodium Carbonate, and in particular to a technology for preparing hydrogen chloride and ammonia gas by using ammonium chloride.

BACKGROUND

In recent years, demand of Sodium Carbonate is increased quickly, but its byproduct, ammonium chloride, has limited applications in the chemical fertilizer field, thus there is an urgent need to find an appropriate utilization of ammonium chloride. If ammonium chloride is decomposed into $NH_3$ and HCl having a high economic value, $NH_3$ may be recycled in Sodium Carbonate industry, and HCl may also be applied in many fields such as organochlorine chemical industry.

$NH_4Cl$ may be decomposed into $NH_3$ and HCl by being heated, but a great amount of $NH_4Cl$ is sublimated simultaneously, and the generated $NH_3$ and HCl are difficult to be separated, small $NH_4Cl$ particles are easily to be regenerated. Hence, the preparation of hydrogen chloride and ammonia gas by decomposing ammonium chloride has not been used in large-scale industrial applications in the world.

In order to obtain decomposition products, $NH_3$ and HCl, from $NH_4Cl$, a feasible method is to add a reusable acidic (or alkaline) cyclic medium to a reactant $NH_4Cl$, so that the medium first reacts with $NH_3$ (or HCl) generated by a heating process, to form an intermediate product and HCl (or $NH_3$) is released first; and then, the intermediate product is further pyrolyzed to release $NH_3$ (or HCl). Some patents and literatures push forward some chemical routes or conceptual processes based on the above-described route. For example, a US patent publication No. U.S. Pat. No. 1,718,420A proposes a chemical route for obtaining HCl and $NH_3$ in steps by using $NH_4HSO_4$ as a cyclic medium; a US patent publication No. U.S. Pat. No. 2,787,524A is to obtain HCl and $NH_3$ in steps by using $NaHSO_4/NH_4HSO_4$ as a cyclic medium; and based on the above routes, a US patent publication No. U.S. Pat. No. 4,293,532A further proposes a temperature for each reaction step and a stoichiometric ratio of each reactant. However, an integral preparation system which can be conveniently implemented in the industry and a corresponding operation method haven't been proposed in the disclosed literatures.

SUMMARY

In view of this, to solve the above-mentioned problems in the prior art, the present disclosure provides a system and method for preparing hydrogen chloride and ammonia gas by using ammonium chloride.

According to one aspect of the present disclosure, a system for preparing hydrogen chloride and ammonia gas by using ammonium chloride is provided. The system comprises at least one reactor, ammonium chloride and molten-state ammonium hydrogen sulfate are subjected to a decomposition reaction in the at least one reactor to output hydrogen chloride gas and obtain an intermediate material; the intermediate material is subjected to a regeneration reaction to output ammonia gas and obtain ammonium hydrogen sulfate; and the decomposition reaction and the regeneration reaction take place in a same reactor of the at least one reactor in different working stages, or take place in multiple reactors of the at least one reactor, wherein the multiple reactors can be communicated. One characteristic of the system of the present disclosure lies in: the ammonium chloride in solid particle form is continuously added to the at least one reactor, so the at least one reactor at least comprises a solid particle feed apparatus which is capable of continuous feeding, and is configured to add the ammonium chloride in solid particle form to the at least one reactor.

The solid particle feed apparatus comprises a quantitative delivery apparatus, a feed tube located on a decomposition reactor of the at least one reactor, and a segment of tube communicated with the delivery apparatus and the feed tube, wherein one end of the feed tube is located on a wall of the decomposition reactor, and another end of the feed tube is located in the decomposition reactor and under a liquid level of liquid material.

One form of the system according to the present disclosure is that, the decomposition reaction and the regeneration reaction take place in the multiple reactors which can be communicated. Under this circumstance, the at least one reactor includes: the decomposition reactor of the multiple reactors, which is configured to take place the decomposition reaction and has a solid particle feed apparatus, a liquid feed port, a liquid discharge port and an exhaust port; and at least one regeneration reactor, connected to the decomposition reactor, configured to take place the regeneration reaction, and having a liquid feed port, a liquid discharge port and an exhaust port. The system further comprises at least one desorption apparatus connected to the decomposition reactor; and in the at least one desorption apparatus, hydrogen chloride gas dissolved in a reaction material is separated out. The at least one desorption apparatus includes a liquid feed port, a carrier gas input port, a liquid discharge port and an exhaust port; the liquid feed port of the at least one desorption apparatus is connected to the liquid discharge port of the decomposition reactor; and the liquid discharge port of the desorption apparatus is connected to the liquid feed port of the regeneration reactor. A connecting tube, through which liquid material returns from the regeneration reactor to the decomposition reactor, is further included between the regeneration reactor and the decomposition reactor.

Each of the decomposition reactor and the regeneration reactor has a heating apparatus and a temperature control apparatus.

A first situation where the decomposition reaction and the regeneration reaction take place in the multiple reactors which can be communicated is that, one decomposition reactor and one regeneration reactor are provided.

A second situation is that: multiple decomposition reactors and one regeneration reactor are provided.

A third situation is that: one decomposition reactor and multiple regeneration reactor are provided.

A fourth situation is that: multiple decomposition reactors and multiple regeneration reactor are provided.

When the decomposition reaction and the regeneration reaction take place in the multiple reactors which can be communicated, the system further includes at least one molten salt pump, located at a junction between the liquid discharge port of the decomposition reactor and the liquid feed port of the regeneration reactor and/or located at a junction between the liquid feed port of the decomposition reactor and the liquid discharge port of the regeneration reactor. The system further includes: a heat preservation apparatus, located at a junction between different ones of the multiple reactors.

When multiple decomposition reactors are provided, the multiple decomposition reactors are connected serially, that is, the liquid discharge port of a previous one of the multiple decomposition reactors is connected to the liquid feed port of a later one of the multiple decomposition reactors; the liquid discharge port of a last one of the multiple decomposition reactors is connected to the feed port of the desorption apparatus; and under this circumstance, at least a first one of the multiple decomposition reactors comprises a solid particle feed apparatus and a heating apparatus; and each of the multiple decomposition reactors comprises a temperature control apparatus.

In some embodiments, for the multiple decomposition reactors connected serially, a reaction temperature of a later one of the multiple decomposition reactors is not higher than that of a previous one of the multiple decomposition reactors.

In some embodiments, for the multiple decomposition reactors connected serially, each of the multiple decomposition reactors comprises a solid particle feed apparatus.

In some embodiments, a number of the multiple decomposition reactors connected serially is 2 to 3.

When the multiple regeneration reactors are provided, the multiple regeneration reactors are connected serially, that is, the liquid discharge port of a previous one of the multiple regeneration reactors is connected to the liquid feed port of a later one of the multiple regeneration reactors; and the liquid discharge port of a last one of the multiple regeneration reactors is at least connected to the liquid feed port of the first decomposition reactor.

When the at least one regeneration reactor comprises multiple regeneration reactors, the multiple regeneration reactors may be connected in parallel, that is, the liquid discharge port of each regeneration reactor is connected to the liquid feed port of the decomposition reactor, and the liquid feed port of each regeneration reactor is connected to the liquid discharge port of the decomposition reactor.

In some embodiments, the decomposition reactor includes a stirred tank reactor and/or a rotary drum reactor; and the regeneration reactor includes a tubular reactor, a stirred tank reactor and/or a rotary drum reactor.

Another form of the system of the present disclosure is that the decomposition reaction and the regeneration reaction take place in a same reactor in different working stages. At this time, the reactor is a stirred tank reactor and/or a rotary drum reactor.

According to another aspect of the present disclosure, a method for preparing hydrogen chloride gas and ammonia gas by using ammonium chloride as raw material based on the above-mentioned system is provided. The method comprises: adding ammonium hydrogen sulfate from a regeneration reactor to a decomposition reactor via a liquid feed port; continuously adding ammonium chloride in solid particle form to the decomposition reactor via a solid particle feed apparatus, producing a reaction between the ammonium chloride and molten-state ammonium hydrogen sulfate in the decomposition reactor to generate hydrogen chloride gas and intermediate material, continuously exhausting the generated hydrogen chloride gas via an exhaust port, and discharging the generated intermediate material via a liquid discharge port; flowing the intermediate material to a feed port of a desorption apparatus by use of a height difference or a molten salt pump, and charging inert carrier gas to the desorption apparatus, so as to make the dissolved hydrogen chloride gas combined into the carrier gas; discharging the desorbed intermediate material from the liquid discharge port of the desorption apparatus to enter a regeneration reactor; heating the desorbed intermediate material in the regeneration reactor to decompose the desorbed intermediate material into ammonium hydrogen sulfate and ammonia gas; and continuously exhausting the generated ammonia gas via the exhaust port, discharging the generated ammonium hydrogen sulfate via the liquid discharge port, and returning the generated ammonium hydrogen sulfate to the decomposition reactor by use of a molten salt pump or a height difference.

A reaction temperature range of the decomposition reaction is 150° C.-280° C., and a reaction temperature range of the regeneration reaction is 280° C.-380° C.

The inert carrier gas is hot air at the temperature of 240° C.-280° C.

According to a method for preparing hydrogen chloride and ammonia gas with ammonium chloride as raw material based on a system of the present disclosure, when the decomposition reaction and the regeneration reaction take place in multiple reactors which can be communicated, one preferable operation manner is to continuously perform following steps: adding ammonium chloride in particle form to the decomposition reactor at a constant rate via a solid particle feed apparatus; flowing molten-state ammonium hydrogen sulfate from the regeneration reactor to the decomposition reactor via a liquid feed port; producing a reaction between the ammonium chloride and the ammonium hydrogen sulfate in the decomposition reactor to generate hydrogen chloride gas and intermediate material, exhausting the generated hydrogen chloride gas via an exhaust port, and continuously discharging the generated intermediate material via a liquid discharge port; flowing the intermediate material to a feed port of a desorption apparatus by use of a height difference or a molten salt pump, and charging inert carrier gas to the desorption apparatus, so as to make the dissolved hydrogen chloride gas combined into the carrier gas; continuously discharging the desorbed intermediate material from the liquid discharge port of the desorption apparatus to enter the regeneration reactor; heating the desorbed intermediate material in the regeneration reactor to decompose the desorbed intermediate material into ammonium hydrogen sulfate and ammonia gas; and continuously exhausting the generated ammonia gas via the exhaust port, continuously discharging the generated ammonium hydrogen sulfate via the liquid discharge port, and returning the generated ammonium hydrogen sulfate to the decomposition reactor by use of a molten salt pump or a height difference.

In some embodiments, a flow ratio of the ammonium hydrogen sulfate to the ammonium chloride in the decomposition reactor is 1.5:1-3:1, and the flow ratio is calculated based on substance amount.

According to a method for preparing hydrogen chloride and ammonia gas by using ammonium chloride as raw material based on a system of the present disclosure, when the decomposition reaction and the regeneration reaction take place in a same reactor in different working stages, an operation manner can be as follows: heating ammonium hydrogen sulfate in the reactor to a molten state; continuously adding ammonium chloride in particle form to the reactor at a certain rate via a solid particle feed apparatus, and producing a reaction between the ammonium chloride and the ammonium hydrogen sulfate to generate the hydrogen chloride gas and an intermediate material in the reactor under a decomposition reaction temperature; continuously exhausting the hydrogen chloride gas via an exhaust port; after the ammonium chloride reacts completely, heating the reactor to a regeneration reaction temperature, so that the intermediate material is heated in the reactor to decompose into ammonium hydrogen sulfate and ammonia gas; exhausting the ammonia gas via the exhaust port; and after the intermediate material reacts completely, lowering the temperature of the reactor to the decomposition reaction temperature, to enter a next operation batch.

In some embodiments, in the reactor, a substance amount ratio of the added ammonium chloride to the ammonium hydrogen sulfate in the system is 2:3-2:5 in one operation batch.

In some embodiments, when the decomposition reaction and the regeneration reaction take place in the same reactor in different working stages, a temperature range of the decomposition reaction is 150° C.-280° C., and a temperature range of the regeneration reaction is 280° C.-380° C.

According to a method for preparing hydrogen chloride gas and ammonia gas by using ammonium chloride as raw material based on a system of the present disclosure, preferably, a mesh number of each ammonium chloride particle is not smaller than 20 meshes, and the mesh number is based on a Tyler standard screen scale.

According to a system and method for preparing hydrogen chloride and ammonia gas by using ammonium chloride provided by the present disclosure, compared with the prior art, the present disclosure provides a detailed system design, an apparatus and a preparation method, gives an industrial feasible specific implementation solution for continuous decomposition of ammonium chloride, reduces volatilization of ammonium chloride by continuously and slowly adding ammonium chloride in solid particle form, and improves conversion rate and utilization rate of ammonium chloride.

BRIEF DESCRIPTION OF THE DRAWINGS

By describing the embodiments of the present disclosure below with reference to the accompanying drawings, the above and other objectives, characteristics and advantages of the present disclosure will be clearer.

DESCRIPTION OF THE EMBODIMENTS

The present invention will be described below in detail with reference to the accompanying drawings. In each drawing, a same element is represented by using a similar numeral. For the clarity, each part in the accompanying drawings is not drawn proportionally. In addition, some known part may not be shown.

Many particular details of the present invention are described below, for the ease of a clear understanding of the present disclosure. However, as a person skilled in the art can understand, the present invention may not be implemented according to these particular details.

The principles and specific implementation solutions of the present disclosure are illustrated below in combination with the accompanying drawings and specific embodiments. Unless otherwise specified, solid materials of $NH_4Cl$ and $NH_4HSO_4$ used in the present disclosure are all commercially-available industrial chemical materials. A granularity of $NH_4Cl$ is 50 meshes (Tyler standard screen scale), and $NH_4HSO_4$ molten liquid is obtained by heating $NH_4HSO_4$ in solid form.

Figure 1:
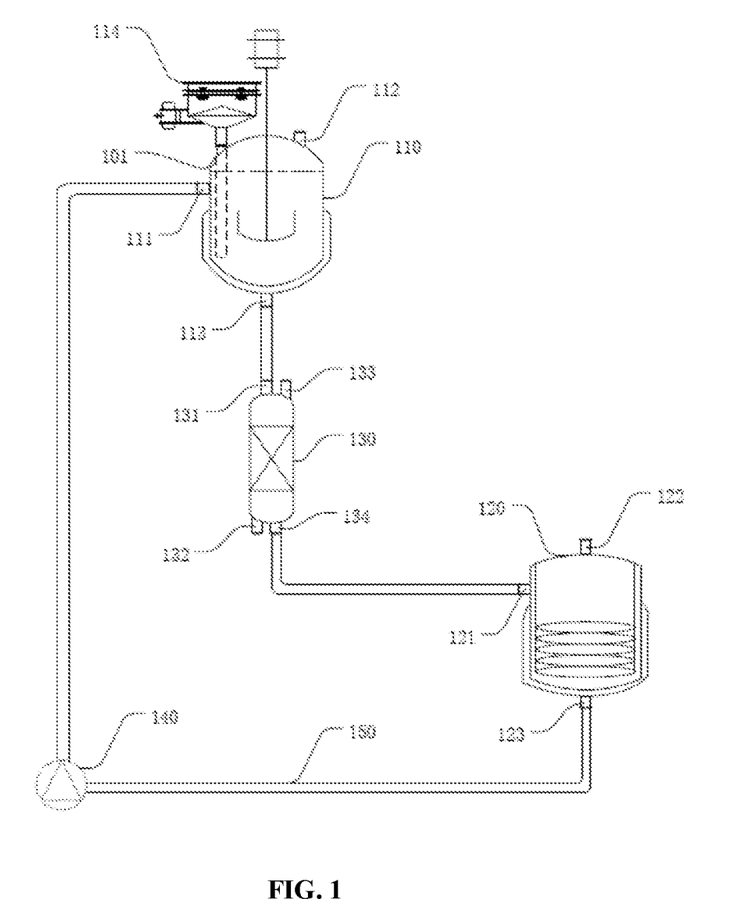
FIG. 1 shows a schematic diagram of a preparation system according to a first embodiment of the present disclosure.

The present disclosure uses a chemical cycling concept, and introduces ammonium hydrogen sulfate ($NH_4HSO_4$) as a cycling medium, thus implementing decomposition of ammonium chloride and separation of $NH_3$ and $HCl$. Chemical reactions involved in the present disclosure are as follows:

$NH_4Cl+NH_4HSO_4 \rightarrow (NH_4)_2SO_4+HCl\uparrow \Delta H=68.3$ kJ/mol  $NH_4Cl$ decomposition reaction:

$(NH_4)_2SO_4 \rightarrow NH_4HSO_4+NH_3\uparrow \Delta H=108.0$ kJ/mol  $NH_4HSO_4$ regeneration reaction:

FIG. 1 shows a schematic diagram of a preparation system according to a first embodiment of the present disclosure. The preparation system according to the first embodiment comprises: a decomposition reactor 110, a regeneration reactor 120, a desorption apparatus 130, a molten salt pump 140 and a connecting tube 150.

In this embodiment, the decomposition reactor 110 is a stirred tank reactor, and comprises: a liquid feed port 111, an exhaust port 112, a liquid discharge port 113, and a solid particle feed apparatus 114. The solid particle feed apparatus 114 comprises: a feed tube 101 and a quantitative delivery apparatus. The feed tube 101 extends from a wall of the decomposition reactor 110 to a position under a liquid level of liquid material inside the decomposition reactor 110, and the quantitative delivery apparatus is communicated with the feed tube 101 via a tube. The regeneration reactor 120 is a tank reactor, and comprises: a liquid feed port 121, an exhaust port 122, and a liquid discharge port 123. The desorption apparatus 130 is a bubble tower, and comprises: a liquid feed port 131, a carrier gas input port 132, an exhaust port 133, and a liquid discharge port 134.

In this embodiment, one decomposition reactor 110 and one regeneration reactor 120 are provided. The liquid discharge port 113 of the decomposition reactor is communicated with the liquid feed port 131 of the desorption apparatus via the connecting tube 150. The liquid discharge port 134 of the desorption apparatus is communicated with the liquid feed port 121 of the regeneration reactor via the connecting tube 150. The liquid discharge port 123 of the regeneration reactor is communicated with the liquid feed port 111 of the decomposition reactor via the connecting tube 150.

An operation process of the preparation system according to the first embodiment of the present disclosure comprises: adopting a continuous operation to continuously adding ammonium chloride in particle form to the decomposition reactor 110 at a certain flow via the solid particle feed apparatus 114, thus the ammonium chloride can react with molten-state ammonium hydrogen sulfate. HCl gas, which is generated by a decomposition reaction and overflows from the molten liquid, is exhausted via the exhaust port 112, and sent to a subsequent process out of the system. Intermediate material (a mixed solution of ammonium hydrogen sulfate and ammonium sulfate) after the reaction is discharged to the desorption apparatus 130 via the liquid discharge port 113 of the decomposition reactor, the connecting tube 150 and the liquid feed port 131. Hot air (having an inlet temperature of 240° C.-280° C.) serves as a carrier gas, and is delivered to the desorption apparatus 130 via a carrier gas port 132. In addition to the hydrogen chloride gas dissolved in the intermediate material, hydrogen chloride gas is exhausted via the exhaust port 133. The intermediate material, in which the hydrogen chloride gas is removed, enters the regeneration reactor 120 via the liquid discharge port 134, the connecting tube 150 and the liquid feed port 121 of the regeneration reactor. Specifically, the intermediate material may be delivered by means of a height difference (the regeneration reactor 120 is higher than the desorption apparatus 130, and the desorption apparatus 130 is higher than the regeneration reactor 120) or by means of the molten salt pump 140 disposed on the connecting tube 150. In the regeneration reactor 120, the intermediate material from the decomposition reactor 110 is heated to regenerate ammonium hydrogen sulfate and release $NH_3$ gas, the $NH_3$ gas overflows from the molten liquid and is then exhausted via the exhaust port 122, and the ammonium hydrogen sulfate molten liquid is returned to the decomposition reactor from the liquid discharge port 123 of the regeneration reactor and the liquid feed port 111 of the decomposition reactor. A specific delivery method is the same as the method for delivering the intermediate material after the decomposition reaction, and is no longer repeated.

As the decomposition reaction is a two-phase reaction (the ammonium chloride is added to the reactor in a solid particle form), a mixing apparatus needs to be used, thus making the distribution and heating reaction of the solid particles uniform. Hence, the decomposition reactor 110 in this embodiment is a stirring reactor. Certainly, other forms of reactors having the mixing apparatus can be selected by the person of ordinary skill in the art according to common sense and experience, and should be included in a protection scope of the present invention. In order to guarantee a relatively high conversion rate of ammonium chloride, ammonium hydrogen sulfate is excessive in terms of a stoichiometric ratio. In some preferred embodiments, a range of a flow ratio (based on a substance amount, the same below) of the ammonium hydrogen sulfate to the ammonium chloride is 1.5:1-3:1. Since the regeneration reaction is a homogeneous reaction and the reaction rate is relatively slow, the mixing apparatus turns out to be unnecessary in principle, or a tank reactor may also be used.

In addition, both the decomposition reaction and the regeneration reaction are heat absorption reaction, so heat exchanged may be achieved by a jacket disposed on an outer wall of a tank and a coil disposed in the tank. Conduction oil can be used as heating medium. An infrared manner, an electronic manner and other manners may also be used for heating. The reaction temperature in the decomposition reactor is in a range of 150° C.-280° C. The reaction temperature in the regeneration reactor is in a range of 280° C.-380° C.

As a specific embodiment, the decomposition reactor 110 has a volume of 4 $m^3$, a diameter of 1.5 m, a height of 2.25 m and a loading coefficient of 0.7; and the regeneration reactor 120 has a volume of 2.5 $m^3$, a diameter of 1.25 m, a height of 2 m and a loading coefficient of 0.7.

As a specific embodiment, the flow ratio of the added ammonium hydrogen sulfate to the added ammonium chloride is fixed at 2:1, for example, the flow of the ammonium chloride is 8.23 kmol/h, and the flow of the ammonium hydrogen sulfate is 16.46 kmol/h. The decomposition reactor 110 is respectively set at the temperature of 150° C., 180° C., 200° C., 220° C., 240° C., 260° C. and 280° C., and the regeneration reactor 120 is set at the temperature of 350° C. By measuring contents of the hydrogen chloride and the ammonia gas, and calculating the conversion rate, the determination results are as shown in Table 1, where the regeneration conversion rate is a decomposition conversion rate of the ammonia gas relative to the generated ammonium sulfate.

TABLE 1

Reaction Results at Different Decomposition Temperatures

| Material | Temperature | | | | | | |
|---|---|---|---|---|---|---|---|
| | 150° C. | 180° C. | 200° C. | 220° C. | 240° C. | 260° C. | 280° C. |
| HCl/kmol/h | 5.4 | 5.9 | 6.8 | 6.9 | 7.4 | 7.2 | 7.2 |
| $NH_3$/kmol/h | 5 | 5.4 | 6.4 | 6.5 | 7 | 6.8 | 5 |
| Conversion rate of decomposition/% | 65.6 | 71.7 | 82.6 | 83.8 | 89.9 | 87.5 | 87.5 |
| Conversion rate of regeneration/% | 92.6 | 91.5 | 94.1 | 94.2 | 94.6 | 94.4 | 69.4 |

As a specific embodiment, the flow ratio of the ammonium hydrogen sulfate to the ammonium chloride is fixed at 2:1, for example, the flow of the ammonium chloride is 8.23 kmol/h, and that of the ammonium hydrogen sulfate is 16.46 kmol/h. The decomposition reactor 110 is set at the temperature of 240° C., and the regeneration reactor 120 is respectively set at the temperature of 280° C., 300° C., 325° C., 350° C. and 380° C. By measuring contents of the hydrogen chloride and the ammonia gas, and calculating the conversion rate, the determination results are as shown in Table 2, where the regeneration conversion rate is a decomposition conversion rate of the ammonia gas relative to the generated ammonium sulfate.

TABLE 2

Reaction Results at Different Regeneration Temperatures

| Material | Temperature | | | | |
|---|---|---|---|---|---|
| | 280° C. | 300° C. | 325° C. | 350° C. | 380° C. |
| HCl/kmol/h | 7.4 | 7.4 | 7.4 | 7.4 | 7.4 |
| $NH_3$/kmol/h | 6.4 | 6.8 | 7.1 | 7 | 7.2 |
| Conversion rate of decomposition/% | 89.9 | 89.9 | 89.9 | 89.9 | 89.9 |
| Conversion rate of regeneration/% | 86.5 | 91.9 | 96.0 | 94.6 | 97.3 |

As a specific embodiment, data for material balance and heat balance obtained by selecting a process condition, in which the decomposition reactor 110 is set at the temperature of 240° C., and the regeneration reactor 120 is set at the temperature of 325° C., and using an Aspen simulation is referred to Table 3. It is to be noted that since the regeneration reactor 120 has a relatively high temperature, the unreacted $NH_4Cl$ in the decomposition reactor 110 enters the regeneration reactor 120 and volatilizes completely (as a matter of fact, the $NH_4Cl$ is converted into the $NH_3$ and the HCl, and the $NH_3$ and the HCl are further formed into an $NH_4Cl$ crystal actually after being cooled in other processes out of the system), thus resulting in waste of raw material and blockage of a device tube. Therefore, it is very necessary to improve the conversion rate of the $NH_4Cl$ by using the technical solutions according to the present disclosure.

TABLE 3

Data for Material Balance and Heat Balance

| Material flow | | Temperature (° C.) | Flow (kmol/h) | Composition (%, mol) | Enthalpy value (cal/mol) |
|---|---|---|---|---|---|
| Inlet of decomposition reactor | $NH_4Cl$ | 30 | 8.23 | 32.9 | −82105.5 |
| | $NH_4HSO_4$ | 240 | 16.46 | 65.8 | −246090 |
| | $(NH_4)_2SO_4$ | 240 | 0.31 | 1.3 | |
| Liquid-phase outlet of decomposition reactor | $NH_4Cl$ | 240 | 0.82 | 4.7 | −248460 |
| | $NH_4HSO_4$ | 240 | 9.05 | 51.4 | |
| | $(NH_4)_2SO_4$ | 240 | 7.72 | 43.9 | |
| Gas-phase outlet of decomposition reactor | HCl (g) | 240 | 7.41 | 100 | −20552 |
| Gas-phase outlet of regeneration reactor | $NH_4Cl$(g) | 325 | 0.82 | 10 | −14139 |
| | $NH_3$(g) | 325 | 7.41 | 90 | |
| Liquid-phase outlet of regeneration reactor | $NH_4HSO_4$ | 325 | 16.46 | 98.2 | −242750 |
| | $(NH_4)_2SO_4$ | 325 | 0.31 | 1.8 | |

As a comparison example with the present disclosure, an intermittent operation is adopted, and 8.23 kmol of ammonium chloride particles are added to 16.46 kmol of ammonium hydrogen sulfate (the flow ratio of the ammonium hydrogen sulfate to the ammonium chloride is 2:1) at one time. The decomposition reactor 110 is set at the temperature of 240° C., and the regeneration reactor is set at the temperature of 300° C. By measuring contents of the hydrogen chloride and the ammonia gas, and calculating the conversion rate, the determination results are as shown in Table 4. It may be seen that the decomposition conversion rate of the ammonium chloride when the ammonium chloride particles are added at one time is obviously lower than the result when the ammonium chloride particles are added continuously. The regeneration conversion rate is a decomposition conversion rate of the ammonia gas relative to the generated ammonium sulfate.

TABLE 4

Results of Operation When Ammonium Chloride Particles are Added At One Time

| Type | HCl/ kmol/h | $NH_3$/ kmol/h | Conversion rate of decomposition/% | Conversion rate of regeneration/% |
|---|---|---|---|---|
| Result | 6.5 | 6.0 | 79.0 | 92.3 |

Figure 2:
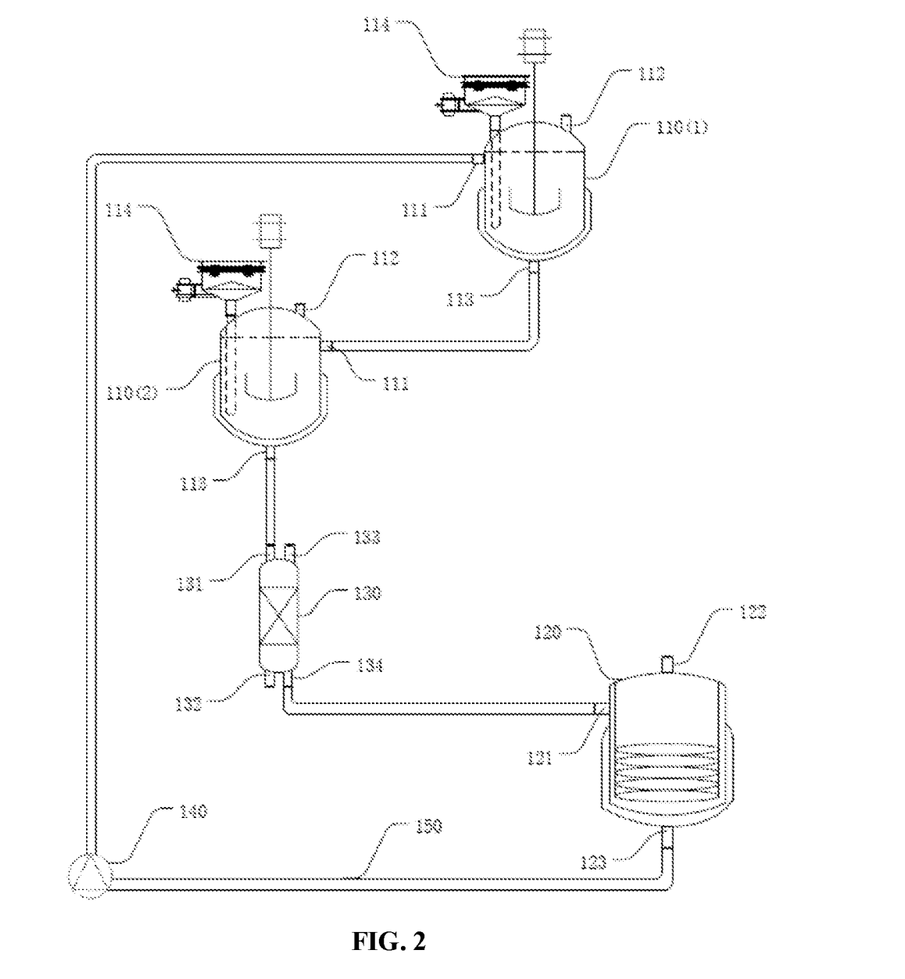
FIG. 2 shows a schematic diagram of a preparation system according to a second embodiment of the present disclosure.

FIG. 2 shows a schematic diagram of a preparation system according to a second embodiment of the present disclosure. The preparation system according to the second embodiment comprises: decomposition reactors 110 (1) and 110 (2), a regeneration reactor 120, a desorption apparatus 130, a molten salt pump 140 and a connecting tube 150.

In this embodiment, each decomposition reactor 110 is a stirred tank reactor, and comprises: a liquid feed port 111, an exhaust port 112, a liquid discharge port 113, and a solid particle feed apparatus 114. The solid particle feed apparatus 114 comprises: a feed tube 101 and a quantitative delivery apparatus. The feed tube 101 extends from a wall of the decomposition reactor 110 to a position under a liquid level of liquid material inside the decomposition reactor 110, and the quantitative delivery apparatus is communicated with the feed tube 101 via a tube. The regeneration reactor 120 is a tank reactor, and comprises: a liquid feed port 121, an exhaust port 122, and a liquid discharge port 123. The desorption apparatus 130 is a bubble tower, and comprises: a liquid feed port 131, a carrier gas input port 132, an exhaust port 133, and a liquid discharge port 134.

In this embodiment, multiple decomposition reactors and one regeneration reactor are provided. The multiple decomposition reactors are connected serially, that is, the liquid discharge port 113 of a previous one of the multiple decomposition reactors is communicated with the liquid feed port 111 of a later one of the multiple decomposition reactors via the connecting tube 150. The liquid discharge port 113 of the last one of the multiple decomposition reactors is connected to the feed port 131 of the desorption apparatus via the connecting tube 150. The liquid discharge port 134 of the desorption apparatus is communicated with the liquid feed port 121 of the regeneration reactor via the connecting tube 150. The liquid discharge port 123 of the regeneration reactor is communicated with the liquid feed port 111 of the decomposition reactor via the connecting tube 150.

The working principle and process of the preparation apparatus according to the second embodiment of the present disclosure are approximately consistent with the first embodiment, and a difference lies in: in order to control a depth of the reaction, an operation manner utilizing multiple decomposition reactors connected serially is performed. Certainly, the regeneration reactor may also use the operation manner utilizing multiple reactors connected serially or in parallel, which will no longer be repeated herein.

As a specific embodiment, each decomposition reactor 110 has a volume of 1.25 m³, a diameter of 1 m, a height of 1.5 m and a loading coefficient of 0.7; and the regeneration reactor 120 has a volume of 2.5 m³, a diameter of 1.25 m, a height of 2 m and a loading coefficient of 0.7. The total flow ratio of the ammonium hydrogen sulfate to the ammonium chloride is fixed at 2:1, for example, the total flow of the ammonium chloride is 8.23 kmol/h. Herein, the flow of the $NH_4Cl$ in the decomposition reactor 110 (1) is 4.92 kmol/h, the flow of the $NH_4Cl$ in the decomposition reactor 110 (2) is 3.31 kmol/h, and the flow of the ammonium hydrogen sulfate is 16.46 kmol/h. The two decomposition reactors are both set at the temperature of 240° C., and the regeneration reactor is set at the temperature of 300° C. By measuring contents of the hydrogen chloride and the ammonia gas, and calculating the conversion rate, the determination results are as shown in Table 5, where the flow of the hydrogen chloride is a sum of flows of hydrogen chloride in the two reactors. The regeneration conversion rate is a decomposition conversion rate of the ammonia gas relative to the generated ammonium sulfate.

TABLE 5

Results When Decomposition Reactors Are Connected Serially By Using Two Same Reaction Tanks

| Type | HCl/ kmol/h | $NH_3$/ kmol/h | Conversion rate of decomposition/% | Conversion rate of regeneration/% |
|---|---|---|---|---|
| Result | 7.9 | 7.4 | 96.0 | 93.7 |

Figure 3:
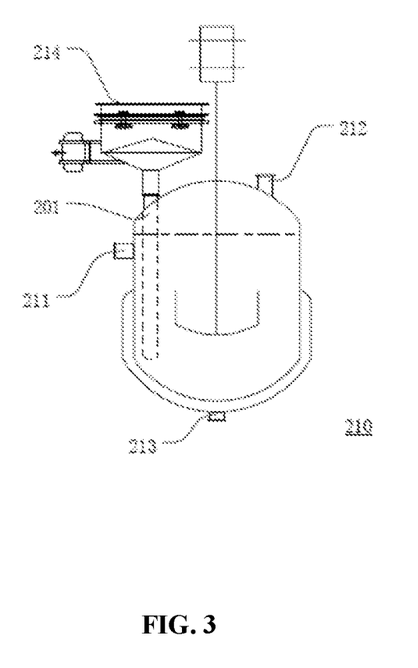
FIG. 3 shows a schematic diagram of a preparation system according to a third embodiment of the present disclosure.

FIG. 3 shows a schematic diagram of a preparation system according to a third embodiment of the present disclosure. Only one reactor is included in this system. Both the decomposition reaction and the regeneration reaction are produced in this reactor, but the decomposition reaction and the regeneration reaction are produced in different working stages and conditions. The reactor 210 according to the third embodiment comprises: a liquid feed port 211, an exhaust port 212, a liquid discharge port 113, and a solid particle feed apparatus 214. The solid particle feed apparatus 214 comprises: a feed tube 201 and a quantitative delivery apparatus. The feed tube 201 extends from a wall of the decomposition reactor 210 to a position under a liquid level of a liquid material inside the decomposition reactor 210, and the quantitative delivery apparatus is communicated with the feed tube 201 via a tube.

The working process of the preparation system according to the third embodiment of the present disclosure comprises: adopting an intermittent operation to heat the ammonium hydrogen sulfate to a molten state in the reactor 210. At a first preset temperature, ammonium chloride in particle form is continuously added to the reactor 210 at a certain flow by using the solid particle feed apparatus 214; the ammonium chloride and the ammonium hydrogen sulfate generate hydrogen chloride gas and an intermediate material in the reactor 210; and the hydrogen chloride gas is exhausted via the exhaust port 212 of the reactor. After a first predetermined time, the intermediate material is heated in the reactor 210 at a second preset temperature to decompose into ammonium hydrogen sulfate and ammonia gas; and ammonia gas is exhausted via the exhaust port 212 of the reactor.

The above-described operation may follow an operation of a common intermittent reactor. The ammonium chloride and the ammonium hydrogen sulfate are added in terms of the above-mentioned optimal proportion, the reactor is heated to a preferred decomposition temperature (the first preset temperature), and the hydrogen chloride gas is delivered to a subsequent process out of the system; after the first predetermined time, the reactor is heated to a preferred regeneration temperature (the second preset temperature) and the ammonia gas is delivered to the subsequent process out of the system; and after a second predetermined time, the reactor is cooled to a preferred decomposition temperature, and the above-described operation is repeated.

As a specific embodiment, the reactor 210 is a stirred tank reactor and has a volume of 4 m³, a diameter of 1.5 m, a height of 2.25 m and a loading coefficient of 0.7; and a molar ratio of the ammonium hydrogen sulfate to the ammonium chloride is fixed at 2:1. An intermittent operation is adopted, the ammonium chloride is added at a certain rate (220 kg/h), 16.46 kmol of ammonium hydrogen sulfate is molten in the reactor in advance, the decomposition temperature is set at 240° C., and the regeneration temperature is set at 300° C. By measuring contents of the hydrogen chloride and the ammonia gas, and calculating the conversion rate, the determination results are as shown in Table 6, where the regeneration conversion rate is a decomposition conversion rate of the ammonia gas relative to the generated ammonium sulfate.

TABLE 6

Results of Operation Using One Reactor

| Type | HCl/ kmol/h | $NH_3$/ kmol/h | Conversion rate of decomposition/% | Conversion rate of regeneration/% |
|---|---|---|---|---|
| Result | 6.3 | 5.7 | 76.5 | 90.5 |

Figure 4:
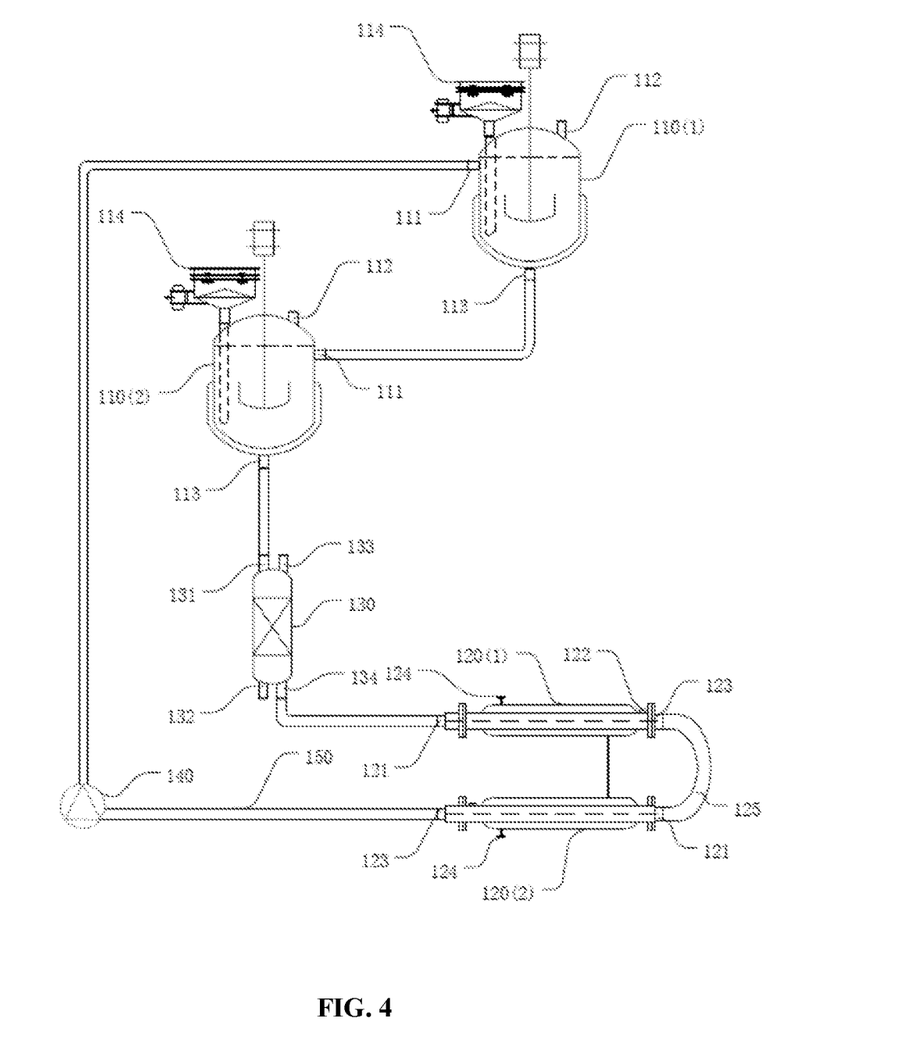
FIG. 4 shows a schematic diagram of a preparation system according to a fourth embodiment of the present disclosure.

FIG. 4 shows a schematic diagram of a preparation system according to a fourth embodiment of the present disclosure. The preparation system according to the fourth embodiment comprises: decomposition reactors 110 (1) and 110 (2), regeneration reactors 120 (1) and 120 (2), a desorption apparatus 130, a molten salt pump 140 and a connecting tube 150.

In this embodiment, the decomposition reactors 110 (1) and 110 (2) are a stirred tank reactor, and each comprise: a liquid feed port 111, an exhaust port 112, a liquid discharge port 113, and a solid particle feed apparatus 114. The solid particle feed apparatus 114 comprises: a feed tube 101 and a quantitative delivery apparatus. The feed tube 101 extends from a wall of the decomposition reactor to a position under a liquid level of liquid material inside the decomposition reactor, and the quantitative delivery apparatus is communicated with the feed tube 101 via a tube. Each of the regeneration reactors 120 (1) and 120 (2) is a tubular reactor, and comprises: a liquid feed port 121, an exhaust port 122, a liquid discharge port 123, and a conduction oil input/output port 124. The desorption apparatus 130 is a bubble tower, and comprises: a liquid feed port 131, a carrier gas input port 132, an exhaust port 133, and a liquid discharge port 134.

In this embodiment, multiple decomposition reactors and multiple regeneration reactors are provided. The multiple decomposition reactors are connected serially, that is, the liquid discharge port 113 of a previous one of the multiple decomposition reactors is communicated with the liquid feed port 111 of a later one of the multiple decomposition reactors via the connecting tube 150. The liquid discharge port 113 of the last one of the multiple decomposition reactors is connected to the feed port 131 of the desorption apparatus via the connecting tube 150. The multiple regeneration reactors are connected serially, that is, the liquid discharge port 123 of a previous one of the multiple regeneration reactors is connected to the liquid feed port 121 of a later one of the multiple regeneration reactors via a connecting tube 125, the liquid feed port 121 of the first one of the multiple regeneration reactors is connected to the discharge port 134 of the desorption apparatus via the connecting tube 150, the liquid discharge port 123 of the last one of the multiple regeneration reactors is connected to the liquid feed port 111 of the first one of the multiple decomposition reactors via the connecting tube 150.

The working principle and process of the preparation system according to the fourth embodiment of the present disclosure are approximately consistent with the first embodiment, and a difference lies in: in view of long reaction time and large reaction heat load, in order to increase the heat transfer area and prolong the retention time, an operation manner utilizing multiple tubular reactors connected serially is adopted, where a heating manner is to heat by use of heating medium outside a tube. Certainly, the regeneration reactor may also use the operation manner utilizing multiple reactors in parallel, which will no longer be repeated herein.

As a specific embodiment, each decomposition reactor is the same as the third embodiment, or it may also be appropriate to only dispose the solid particle feed apparatus 114 in the first decomposition reactor 110 (1). The regeneration reactor can be implemented by use of two segments of tubular reactors connected serially, and each segment of tubular reactor has a volume of 1.25 m³, a diameter of 0.5 m, and a length of 6.37 m. The molar ratio of the added ammonium hydrogen sulfate to the added ammonium chloride is fixed at 2:1, for example, the molar ratio of the ammonium chloride is 8.233 kmol/h, and the molar ratio of the ammonium hydrogen sulfate is 16.466 kmol/h. The reaction temperature of the two decomposition reactors 110 (1) and 110 (2) is 240° C., and the reaction temperature of the two regeneration reactors 120 (1) and 120 (2) is 300° C. By measuring contents of the hydrogen chloride and the ammonia gas, and calculating the conversion rate, the determination results are as shown in Table 7, where the regeneration conversion rate is a decomposition conversion rate of the ammonia gas relative to the generated ammonium sulfate.

TABLE 7

Results When Regeneration Reactor Uses Two Segments of Tubular Reactors Connected Serially

| Type | HCl/ kmol/h | NH$_3$/ kmol/h | Conversion rate of decomposition/% | Conversion rate of regeneration/% |
|---|---|---|---|---|
| Result | 7.9 | 7.6 | 96 | 96.2 |

Figure 5:
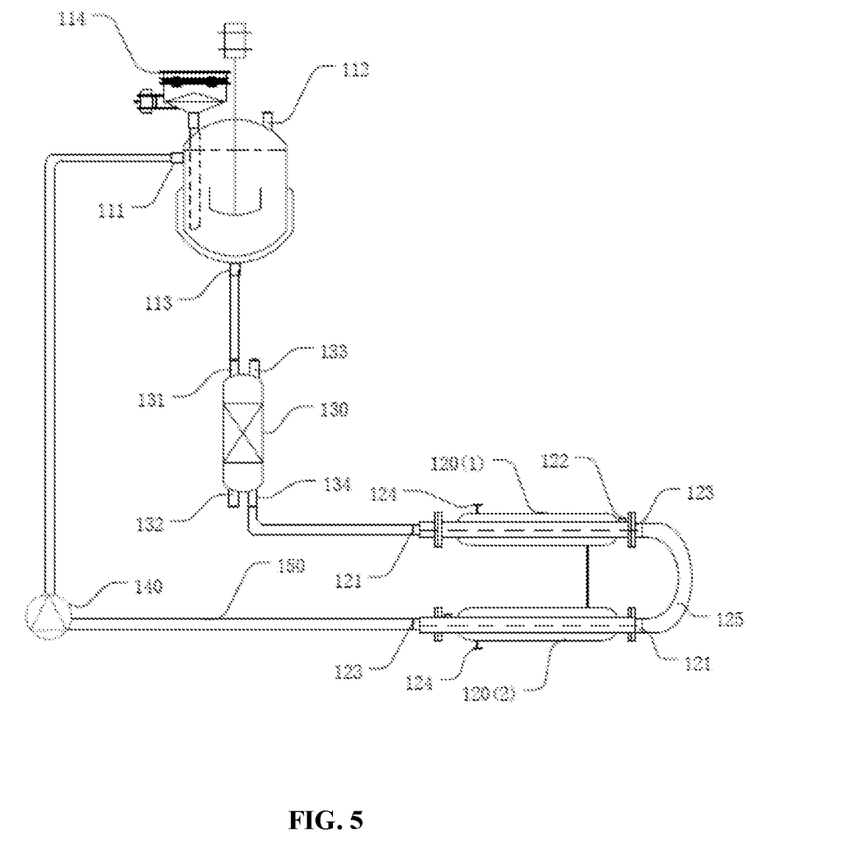
FIG. 5 shows a schematic diagram of a preparation system according to a fifth embodiment of the present disclosure.

FIG. 5 shows a schematic diagram of a preparation system according to a fifth embodiment of the present disclosure. The preparation system according to the fifth embodiment comprises: a decomposition reactor 110, regeneration reactors 120 (1) and 120 (2), a desorption apparatus 130, a molten salt pump 140 and a connecting tube 150.

In this embodiment, the decomposition reactor 110 is a stirred tank reactor, and comprises: a liquid feed port 111, an exhaust port 112, a liquid discharge port 113, and a solid particle feed apparatus 114. The solid particle feed apparatus 114 comprises: a feed tube 101 and a quantitative delivery apparatus. The feed tube 101 extends from a wall of the decomposition reactor to a position under a liquid level of liquid material inside the decomposition reactor, and the quantitative delivery apparatus is communicated with the feed tube 101 via a tube. Each of the regeneration reactors 120 (1) and 120 (2) is a tubular reactor, and comprises: a liquid feed port 121, an exhaust port 122, a liquid discharge port 123, and a conduction oil output/input port 124. The desorption apparatus 130 is a bubble tower, and includes: a liquid feed port 131, a carrier gas input port 132, an exhaust port 133, and a liquid discharge port 134.

In this embodiment, one decomposition reactor and multiple regeneration reactors are provided. The liquid discharge port 113 of the decomposition reactor is connected to the feed port 131 of the desorption apparatus via the connecting tube 150. The multiple regeneration reactors are connected serially, that is, the liquid discharge port 123 of a previous one of the multiple regeneration reactors is connected to the liquid feed port 121 of a later one of the multiple regeneration reactors via a connecting tube 125, the liquid feed port 121 of the first one of multiple regeneration reactors is connected to the discharge port 134 of the desorption apparatus via the connecting tube 150, the liquid discharge port 123 of the last one of the multiple regeneration reactors is connected to the liquid feed port 111 of the decomposition reactor via the connecting tube 150.

The working principle and process of the preparation system according to the fifth embodiment of the present disclosure are approximately consistent with the fourth embodiment, and a difference lies in: the number of the decomposition reactor is one.

As a specific embodiment, the decomposition reactor 110 has a volume of 4 m³, a diameter of 1.5 m, a height of 2.25 m and a loading coefficient of 0.7; each regeneration reactor is implemented by use of two segments of tubular reactors connected serially; and each segment of tubular reactor has a volume of 1.25 m³, a diameter of 0.5 m, and a length of 6.37 m. The molar ratio of the added ammonium hydrogen sulfate to the added ammonium chloride is fixed at 2:1, for example, the molar ratio of the ammonium chloride is 8.233 kmol/h, and the molar ratio of the ammonium hydrogen sulfate is 16.466 kmol/h. The reaction temperature of the decomposition reactor is 240° C., and the reaction temperature of the two regeneration reactors 120 (1) and 120 (2) is 300° C. By measuring contents of the hydrogen chloride and the ammonia gas, and calculating the conversion rate, the determination results are as shown in Table 8, where the regeneration conversion rate is a decomposition conversion rate of the ammonia gas relative to the generated ammonium sulfate.

TABLE 8

Results When One Decomposition Reactor is Provided and Each Regeneration Reactor Uses Two Segments of Tubular Reactors Connected Serially

| Type | HCl/ kmol/h | NH$_3$/ kmol/h | Conversion rate of decomposition/% | Conversion rate of regeneration/% |
|---|---|---|---|---|
| Result | 7.6 | 7.2 | 92.3 | 94.7 |

Figure 6:
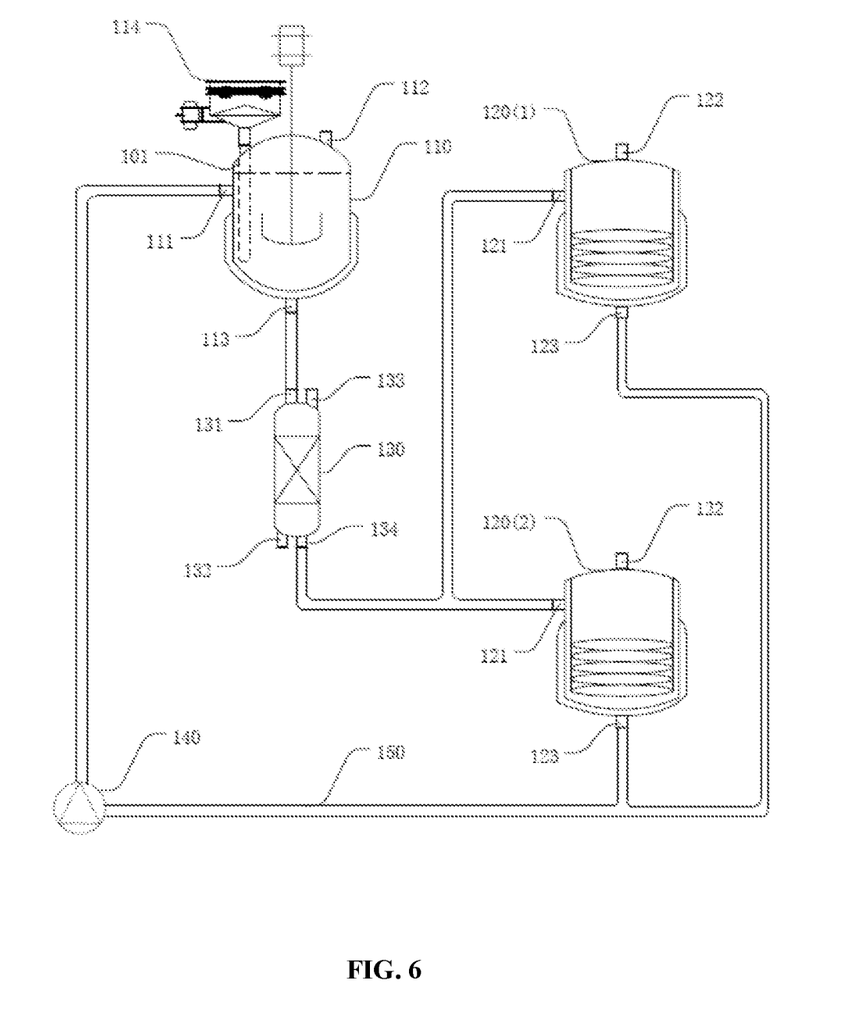
FIG. 6 shows a schematic diagram of a preparation system according to a sixth embodiment of the present disclosure.

FIG. 6 shows a schematic diagram of a preparation system according to a sixth embodiment of the present disclosure. The preparation system according to the sixth embodiment comprises: a decomposition reactor 110, regeneration reactors 120 (1) and 120 (2), a desorption apparatus 130, a molten salt pump 140 and a connecting tube 150.

In this embodiment, the decomposition reactor 110 is a stirred tank reactor, and comprises: a liquid feed port 111, an exhaust port 112, a liquid discharge port 113, and a solid particle feed apparatus 114. The solid particle feed apparatus 114 comprises: a feed tube 101 and a quantitative delivery apparatus. The feed tube 101 extends from a wall of the decomposition reactor to a position under a liquid level of liquid material inside the decomposition reactor, and the quantitative delivery apparatus is communicated with the feed tube 101 via a tube. Each of the regeneration reactors 120 (1) and 120 (2) is a stirred tank reactor, and comprises: a liquid feed port 121, an exhaust port 122, and a liquid discharge port 123. The desorption apparatus 130 is a bubble tower, and includes: a liquid feed port 131, a carrier gas input port 132, an exhaust port 133, and a liquid discharge port 134.

In this embodiment, one decomposition reactor and multiple regeneration reactors are provided. The liquid discharge port 113 of the decomposition reactor is connected to the feed port 131 of the desorption apparatus via the connecting tube 150. The multiple regeneration reactors are connected in parallel, that is, the liquid feed port 121 of each regeneration reactor is communicated with the discharge port 134 of the desorption apparatus via the connecting tube 150, and the liquid discharge port 123 of each regeneration reactor is communicated with the liquid feed port 111 of the decomposition reactor via the connecting tube 150.

The working principle and process of the preparation system according to the sixth embodiment of the present disclosure are approximately consistent with the fifth embodiment, and a difference lies in: each of the regeneration reactors is a tank reactor.

As a specific embodiment, the decomposition reactor 110 has a volume of 4 m$^3$, a diameter of 1.5 m, a height of 2.25 m and a loading coefficient of 0.7; each regeneration reactor is implemented by use of two tank reactors connected in parallel; and each reactor has a volume of 1.25 m$^3$, a diameter of 0.84 m, a height of 1.26 m and a loading coefficient of 0.7. The molar ratio of the added ammonium hydrogen sulfate to the added ammonium chloride is fixed at 2:1, for example, the molar ratio of the ammonium chloride is 8.233 kmol/h, and the molar ratio of the ammonium hydrogen sulfate is 16.466 kmol/h. The reaction temperature of the decomposition reactor is 240° C., and the reaction temperature of the two regeneration reactors 120 (1) and 120 (2) is 300° C. By measuring contents of the hydrogen chloride and the ammonia gas, and calculating the conversion rate, the determination results are as shown in Table 9, where the regeneration conversion rate is a decomposition conversion rate of the ammonia gas relative to the generated ammonium sulfate.

TABLE 9

Results When Regeneration Reactor Uses Two Parallel-Connected Tank Reactors

| Type | HCl/ kmol/h | NH$_3$/ kmol/h | Conversion rate of decomposition/% | Conversion rate of regeneration/% |
|---|---|---|---|---|
| Result | 7.7 | 7.4 | 93.5 | 96.1 |

It is to be noted that corresponding means for measuring and controlling the temperature, the liquid level and the like and corresponding valves can be further arranged on the decomposition reactor and the regeneration reactor according to the common sense of the person of ordinary skill in the art. Although these components are not indicated in the accompanying drawings one by one, it does not mean that the process of the present invention exclude these conventional designs. The feeding rate of the raw materials in the present invention is adjusted according to the conversion rate and material balance, which is also a commonsensible conventional design for the person of ordinary skill in the art. Although the design is not indicated in the present disclosure one by one, it does not mean that the process of the present invention excludes the conventional design.

According to the above-described embodiments of the present invention, these embodiments neither elaborate all details nor limit that the present invention only has the above specific embodiments. Obviously, many modifications and changes may be made according to the above description. The selection and specific description of these embodiments in the specification are to better explain the principles and actual applications of the present invention, so that the person skilled in the art can well utilize the present invention and make modifications on the basis of the present invention in use.

What is claimed is:

1. A system for preparing hydrogen chloride gas and ammonia gas by using ammonium chloride, wherein
the system comprises a set of reactors;
the ammonium chloride and ammonium hydrogen sulfate are subjected to a decomposition reaction in the set of reactors to output the hydrogen chloride gas and obtain an intermediate material;
the intermediate material is subjected to a regeneration reaction to output the ammonia gas and obtain the ammonium hydrogen sulfate; and
the decomposition reaction and the regeneration reaction take place in the set of reactors which are communicated, and the ammonium chloride is continuously added to the set of reactors in solid particle form,
wherein the set of reactors comprises:
a set of decomposition reactors, configured to conduct the decomposition reaction, and comprising: a solid particle feed apparatus, a liquid feed port, a liquid discharge port and an exhaust port; and
a set of regeneration reactors, configured to conduct the regeneration reaction, and comprising: a liquid feed port, a liquid discharge port and an exhaust port;
at least one desorption apparatus, connected to the set of decomposition reactors, and comprising a liquid feed port, a carrier gas input port, a liquid discharge port and an exhaust port,
wherein the liquid feed port of the at least one desorption apparatus is connected to the liquid discharge port of the set of decomposition reactors, the liquid discharge port of the at least one desorption apparatus is connected to the liquid feed port of the set of regeneration reactors, the liquid discharge port of the set of decomposition reactors is communicated with the liquid feed port of the set of regeneration reactors via a connecting tube, and the liquid feed port of the set of decomposition reactors is communicated with the liquid discharge port of the set of regeneration reactors via a connecting tube,
wherein the set of decomposition reactors refers to multiple decomposition reactors, the multiple decomposition reactors are connected serially,
wherein the set of regeneration reactors refers to multiple regeneration reactors, the multiple regeneration reactors are connected in series or in parallel.

2. The system according to claim 1, wherein the ammonium hydrogen sulfate is in a molten state, and the set of reactors comprises the solid particle feed apparatus, configured to continuously add the ammonium chloride to the set of reactors.

3. The system according to claim 2, wherein the solid particle feed apparatus comprises:
- a feed tube, extending from a wall of a corresponding one of the set of reactors to a position under a liquid level of liquid material in the corresponding one of the set of reactors; and
- a quantitative delivery apparatus, communicated with the feed tube via a tube.

4. The system according to claim 1, wherein
in the at least one desorption apparatus, the hydrogen chloride gas dissolved in the intermediate material, that is received from the set decomposition reactors, is separated out, and exhausted via the exhaust port of the at least one desorption apparatus.

5. The system according to claim 1, wherein the set of decomposition reactors and the set of regeneration reactors further comprise a heating apparatus and a temperature control apparatus.

6. The system according to claim 5, wherein the system further comprises:
- at least one molten salt pump, located at a junction between the liquid discharge port of the set of decomposition reactors and the liquid feed port of the set of regeneration reactors and/or located at a junction between the liquid feed port of the set of decomposition reactors and the liquid discharge port of the set of regeneration reactors; and
- a heat preservation apparatus, located at a junction between the set of reactors.

7. The system according to claim 2, wherein the liquid discharge port of a previous one of the multiple decomposition reactors is communicated with the liquid feed port of a later one of the multiple decomposition reactors,
the liquid discharge port of a last one of the multiple decomposition reactors is connected to the feed port of the at least one desorption apparatus;
at least a first one of the multiple decomposition reactors comprises the solid particle feed apparatus;
at least a first one of the multiple decomposition reactors comprises a heating apparatus; and
each of the multiple decomposition reactors comprises a temperature control apparatus.

8. The system according to claim 7, wherein a later one of the multiple decomposition reactors is configured to provide a reaction temperature, which is not higher than a reaction temperature provided by a previous one of the multiple decomposition reactors.

9. The system according to claim 7, wherein each one of the multiple decomposition reactors comprises the solid particle feed apparatus.

10. The system according to claim 7, wherein the number of the multiple decomposition reactors is 2 to 3.

11. The system according to claim 7, wherein the multiple regeneration reactors are connected serially,
that is, the liquid discharge port of a previous one of the multiple regeneration reactors is communicated with the liquid feed port of a later one of the multiple regeneration reactors,
the liquid feed port of a first one of the multiple regeneration reactors is connected to the liquid discharge port of the at least one desorption apparatus, and
the liquid discharge port of a last one of the multiple regeneration reactors is at least connected to the liquid feed port of the first one of the multiple decomposition reactors.

12. The system according to claim 1, wherein the multiple regeneration reactors are connected serially,
that is, a liquid discharge port of a previous one of the multiple regeneration reactors is communicated with a liquid feed port of a later one of the multiple regeneration reactors,
a liquid feed port of a first one of the multiple regeneration reactors is connected to the liquid discharge port of the set of decomposition reactors, and
a liquid discharge port of a last one of the multiple regeneration reactors is connected to the liquid feed port of the set of decomposition reactorreactors.

13. The system according to claim 1, wherein the multiple regeneration reactors are connected in parallel,
that is, a liquid discharge port of each one of the multiple regeneration reactors is connected to the liquid feed port of the set of decomposition reactors; and
a liquid feed port of each one of the multiple regeneration reactors is connected to the liquid discharge port of the set of decomposition reactors.

14. The system according to claim 1, wherein the set of decomposition reactors comprises a stirred tank reactor and/or a rotary drum reactor; and
the set of regeneration reactors comprises a tubular reactor, a stirred tank reactor and/or a rotary drum reactor.

15. A method for preparing hydrogen chloride gas and ammonia gas by using ammonium chloride, wherein on the method is performed using the system according to claim 1, and the method comprises:
continuously adding the ammonium chloride in solid particle form to the set of reactors;
producing the decomposition reaction, that takes place in the set of decomposition reactors, between the ammonium chloride and the ammonium hydrogen sulfate to output the hydrogen chloride gas and obtain the intermediate material; and
producing the regeneration reaction, that takes place in the set of regeneration reactors, using the intermediate material to output the ammonia gas and obtain the ammonium hydrogen sulfate.

16. The method according to claim 15, wherein the method performs a continuous operation, and comprises:
continuously adding the ammonium chloride in solid particle form to-the set of decomposition reactors at a constant rate via the solid particle feed apparatus;
flowing the ammonium hydrogen sulfate in molten state to the at least oneset of decomposition reactors via the liquid discharge port of the set of regeneration reactors and the liquid feed port of the set of decomposition reactors;
producing the decomposition reaction between the ammonium chloride in solid particle form and the ammonium hydrogen sulfate in the set of decomposition reactors to generate the hydrogen chloride gas and the intermediate material, exhausting the generated hydrogen chloride gas via the exhaust port of the set of decomposition reactors, and continuously discharging the generated intermediate material via the liquid discharge port of the set of decomposition reactors;
flowing the intermediate material to the liquid feed port of the at least one desorption apparatus, and charging inert carrier gas to the at least one desorption apparatus, so as to make the hydrogen chloride gas, which is dissolved, combined into the insert carrier gas;

continuously discharging the intermediate material, which is desorbed, from the liquid discharge port of the at least one desorption apparatus to enter the set of regeneration reactors;

heating the desorbed intermediate material in the set of regeneration reactors to decompose into the ammonium hydrogen sulfate and the ammonia gas; and continuously exhausting the generated ammonia gas via the exhaust port of the set of regeneration reactors, continuously discharging the generated ammonium hydrogen sulfate via the liquid discharge port of the set of regeneration reactors and returning the generated ammonium hydrogen sulfate to the set of decomposition reactors.

17. The method according to claim 16, wherein the inert carrier gas is hot air, and the hot air has a temperature of 240° C.-280° C.

18. The method according to claim 16, wherein a flow ratio of the ammonium hydrogen sulfate flowed to the set of decomposition reactors to the ammonium chloride is 1.5:1-3:1, and the flow ratio is based on moles of substance.

19. The method according to claim 15, wherein a reaction temperature range of the decomposition reaction is 150° C.-280° C., and a reaction temperature range of the regeneration reaction is 280° C.-380° C.

20. The method according to claim 15, wherein a mesh number of the ammonium chloride in solid particle form is not smaller than 20 meshes, and the mesh number is based on a Tyler standard screen scale.

* * * * *